May 13, 1924.    E. DEISTER    1,493,923
VEHICLE TIRE
Filed Dec. 26, 1922
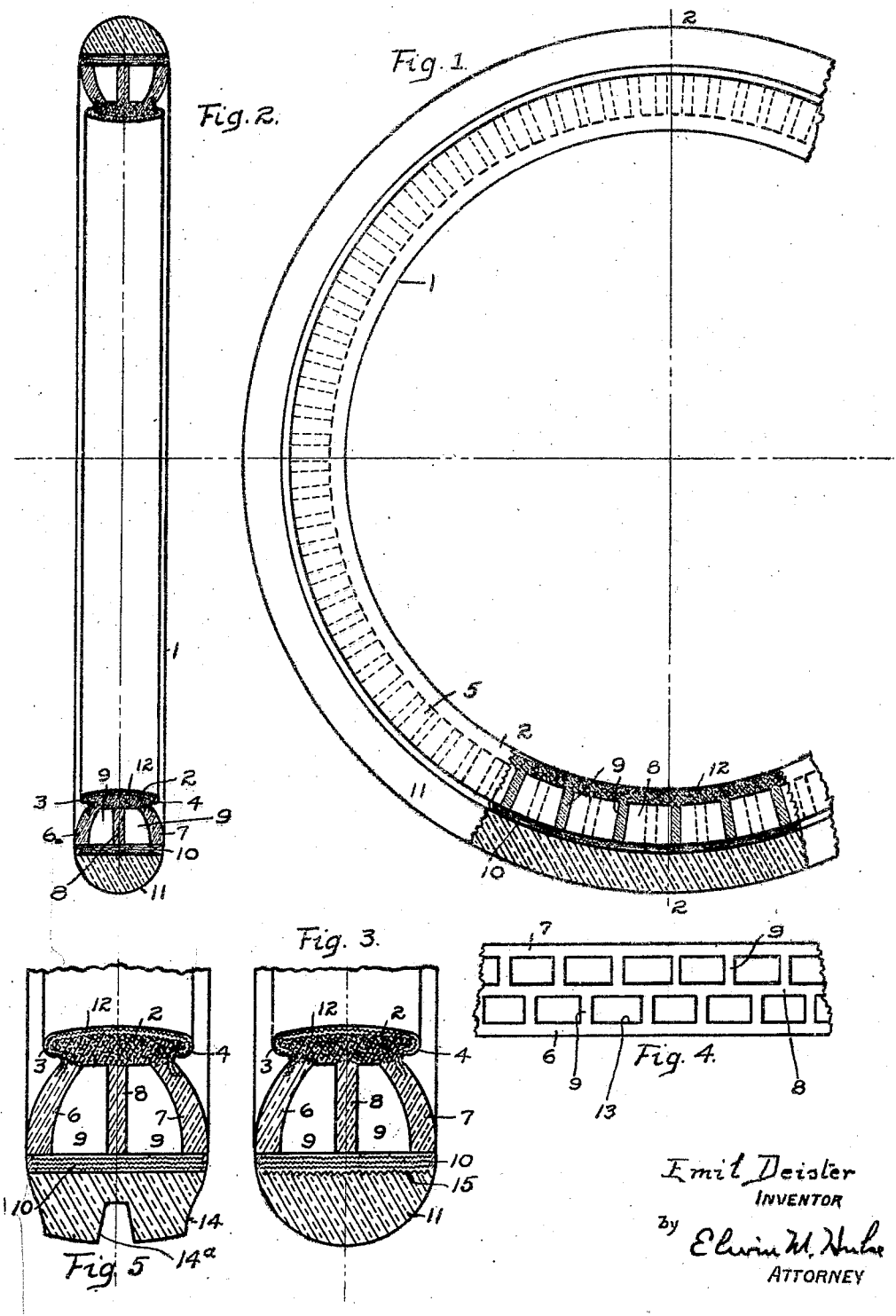

Patented May 13, 1924.

1,493,923

UNITED STATES PATENT OFFICE.

EMIL DEISTER, OF FORT WAYNE, INDIANA.

VEHICLE TIRE.

Application filed December 26, 1922. Serial No. 608,880.

*To all whom it may concern:*

Be it known that I, EMIL DEISTER, a citizen of the United States, residing at Fort Wayne, in the county of Allen and State of Indiana, have invented new and useful Improvements in Vehicle Tires, of which the following is a specification.

The invention relates to tires for motor vehicles, primarily.

The object of the invention is to provide a tire, non-pneumatic in character, that shall have substantially the resilience of a pneumatic tire but without the inconveniences of such a tire, and which shall be economical to build and have great durability.

In the accompanying drawing the invention is illustrated in simple form, in which—

Figure 1 is a fractional elevational view of a tire embodying the invention; Fig. 2 a cross-sectional view of the same on line 2—2 of Fig. 1; Fig. 3 a view similar to Fig. 2 but in enlarged scale; Fig. 4 a fractional view of the tire with the tread and the intermediate reinforcement removed and Fig. 5 a cross-sectional view of the tire with a modified form of tread.

The tire is formed of a body or rim-engaging portion 2 having the beads 3 and 4 at the opposite sides thereof, the beads being omitted in the straight-side type of tire; a cushioning portion 5 formed by the annular side members or walls 6 and 7; a central annular rib 8 and transverse ribs 9 which tie the side members or walls 6 and 7 and the central rib together and therefore reinforce the side walls and prevent their collapse in use. Preferably a reinforcing band 10 formed of rubberized fabric encircles the periphery of the cushioning portion and a tread 11 encircles the band or belt 10.

The cushioning portion is formed of relatively soft, elastic rubber, or "cushioning" rubber as it is termed in the art; the rim-engaging portion is formed of a suitable rubber compound that will permit of its vulcanization to a greater degree of hardness than the cushioning portion 5; the reinforcing band 10 is formed of rubberized fabric and the tread 11 is formed of relatively soft, tough rubber, commonly designated as "tread rubber." The several portions and the band or belt and the tread are vulcanized together into a unitary structure.

The inner face of the rim-engaging portion 2 and the outer surfaces of the beads are covered with rubberized fabric 12 that is also vulcanized thereto. This fabric protects and reinforces the rim-engaging portion.

Since the rim-engaging portion is vulcanized to a greater degree of hardness than the remainder of the tire it may be securely clamped to the rim of the wheel. The cavities or pockets 13 formed between the several ribs and the side members 6 and 7 permit lateral expansion of all the ribs including rib 8 due to the compression thereof incident to the travel of the tire on the road. The side members 6 and 7 also tend to expand outwardly in use, but the ribs 9 limit such movement. The fabric band or belt 10 reinforces the structure as a whole and prevents excessive bulging or crowding of the tread member into the cavities or pockets 13 when the tire is in use. It will be noted that the transverse ribs 9 are shown in staggered order. Such arrangement of the ribs is not essential, but said ribs may be placed in any desired order.

The tire as thus formed may be used in connection with numerous forms of rims. When it is used in connection with a one-piece rim, the rim-engaging portion is preferably made of a suitable elastic rubber that will permit the tire to be pried over the clincher rim, and because of the resilience of this rim-engaging portion its clincher beads will be forced into the clincher grooves of the rim. When it is used in connection with a circumferentially split or two-piece rim, the rim-engaging portion 2 will be made of a rubber vulcanized to a greater degree of hardness than that used in the previously described rim-engaging portion, so that the tire may be clamped securely on the rim.

If desired a breaker strip 15 may be interposed between the tread 11 and the reinforcing band or belt 10, the strip being vulcanized to both said members and in reality forming a part of the band or belt 10.

In Fig. 5, I illustrate a modification of the tread in which the tread 14 is formed with a central annular groove $14^a$ to represent a non-skid tread.

From the foregoing description it will be observed that the tread of the tire is supported and cushioned upon the rim-engaging portion by the cushioning portion, and that the tire as a whole has a very high degree of resilience and will not collapse in use.

What I claim is:

1. A vehicle tire consisting of a rim-engaging portion formed of material adapted to be vulcanized relatively hard; a tread member and a cushioning portion supporting the tread member on the rim-engaging portion and comprising a plurality of laterally spaced annular walls vulcanized to the rim-engaging portion and formed of soft, elastic rubber and a reinforcing member vulcanized to the peripheral edges of the said walls, the tread having a vulcanized connection to the said reinforcing member.

2. A vehicle tire consisting of a rim-engaging portion formed of material adapted to be vulcanized relatively hard, a tread member formed of relatively soft, tough rubber, a reinforcing band formed of rubberized fabric vulcanized to the inner face of the tread and a plurality of annular walls formed of elastic or cushioning rubber vulcanized to the band and to the rim-engaging portion and a plurality of transverse ribs connecting and reinforcing the said walls.

3. A vehicle tire consisting of a rim-engaging portion formed of material adapted to be vulcanized relatively hard, two annular laterally spaced walls formed of elastic rubber vulcanized to opposite sides of the rim-engaging portion, a central annular rib formed of elastic rubber vulcanized to the rim-engaging portion intermediate said walls, transverse ribs vulcanized to said walls, to the central rib and to the rim-engaging portion and formed of elastic rubber for reinforcing the side walls, a reinforcing band or belt formed of rubberized fabric vulcanized to the peripheral edges of the said walls and the central rib and a tread having a vulcanized connection to the belt.

In witness whereof I have hereunto subscribed my name this 21st day of December, 1922.

EMIL DEISTER.